United States Patent [19]
Kage

[11] Patent Number: 6,160,901
[45] Date of Patent: Dec. 12, 2000

[54] PROCESSING DEVICE AND METHOD FOR DETERMINING DIRECTION OF MOTION OF AN IMAGE

[75] Inventor: Hiroshi Kage, Tokyo, Japan

[73] Assignee: Mitsubishi Denki Kabushiki Kaisha, Tokyo, Japan

[21] Appl. No.: 09/017,324

[22] Filed: Feb. 2, 1998

[30] Foreign Application Priority Data

Feb. 28, 1997 [JP] Japan ................................. 9-046750

[51] Int. Cl.[7] .................................................. G06K 9/00
[52] U.S. Cl. ............................................ 382/107; 382/154
[58] Field of Search ............................. 382/107; 348/403

[56] References Cited

U.S. PATENT DOCUMENTS

| | | | |
|---|---|---|---|
| 4,853,775 | 8/1989 | Rouvrais et al. | 358/105 |
| 5,768,404 | 6/1998 | Morimura | 382/107 |
| 5,796,434 | 8/1998 | Lempel | 348/403 |
| 5,894,526 | 4/1999 | Watanabe et al. | 382/236 |

OTHER PUBLICATIONS

Oami, Ryoma, et al. "Motion Estimation Using Distortion Planes of pixel–wise Matching." *Japan Television Society*, 49.3 (1995) pp. 319–327. (w/English Abstract).

*Primary Examiner*—Bijan Tadayon
*Assistant Examiner*—Amir Alavi
*Attorney, Agent, or Firm*—Leydig, Voit & Mayer, Ltd.

[57] ABSTRACT

An image processing device includes a difference image generating unit for selecting two images at different times from among a plurality of images stored in an image storage unit. The image generating unit computes a difference between the selected two images and generates and stores a difference image. A direction estimating unit estimates a direction or bearing of motion of the moving object along each of several axes for each of the pixels based on the difference image held by the difference image generating unit. The direction estimating unit generates one or more vectors representing the directions of motion of the moving object along the axes for each of the pixels. An initially-estimated motion vector unit computes the sum of the vectors estimated by the direction estimating unit and generates an initially-estimated motion vector for each of the pixels. A vector averaging unit averages initially-estimated motion vectors in the vicinity of each of the plurality of pixels, including the initially-estimated motion vector of each of the pixels, and generates a motion vector for each of the pixels.

16 Claims, 4 Drawing Sheets

FIG.1
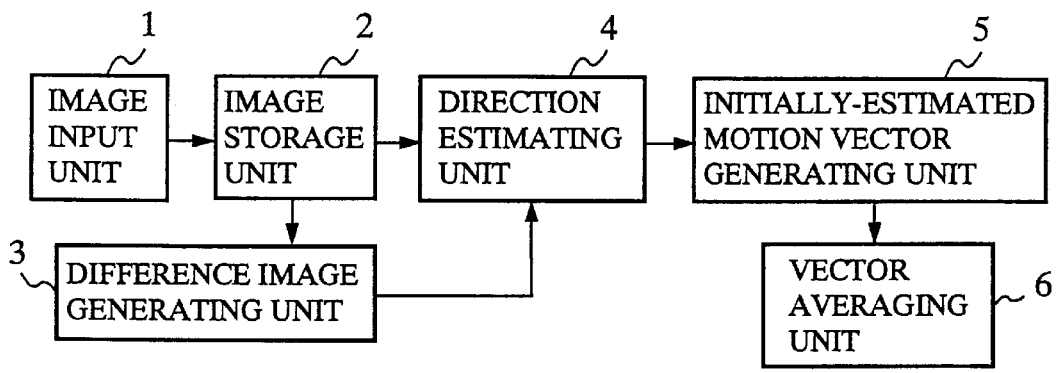
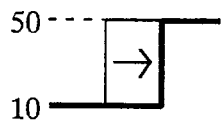
FIG.2a
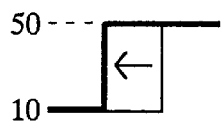
FIG.2b
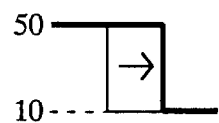
FIG.2c
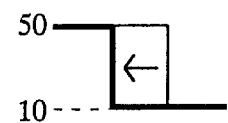
FIG.2d
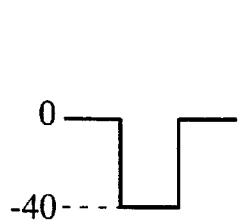
FIG.3a
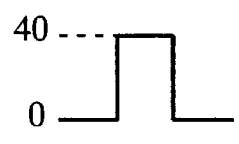
FIG.3b
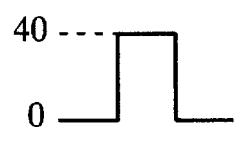
FIG.3c
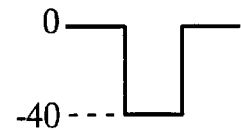
FIG.3d

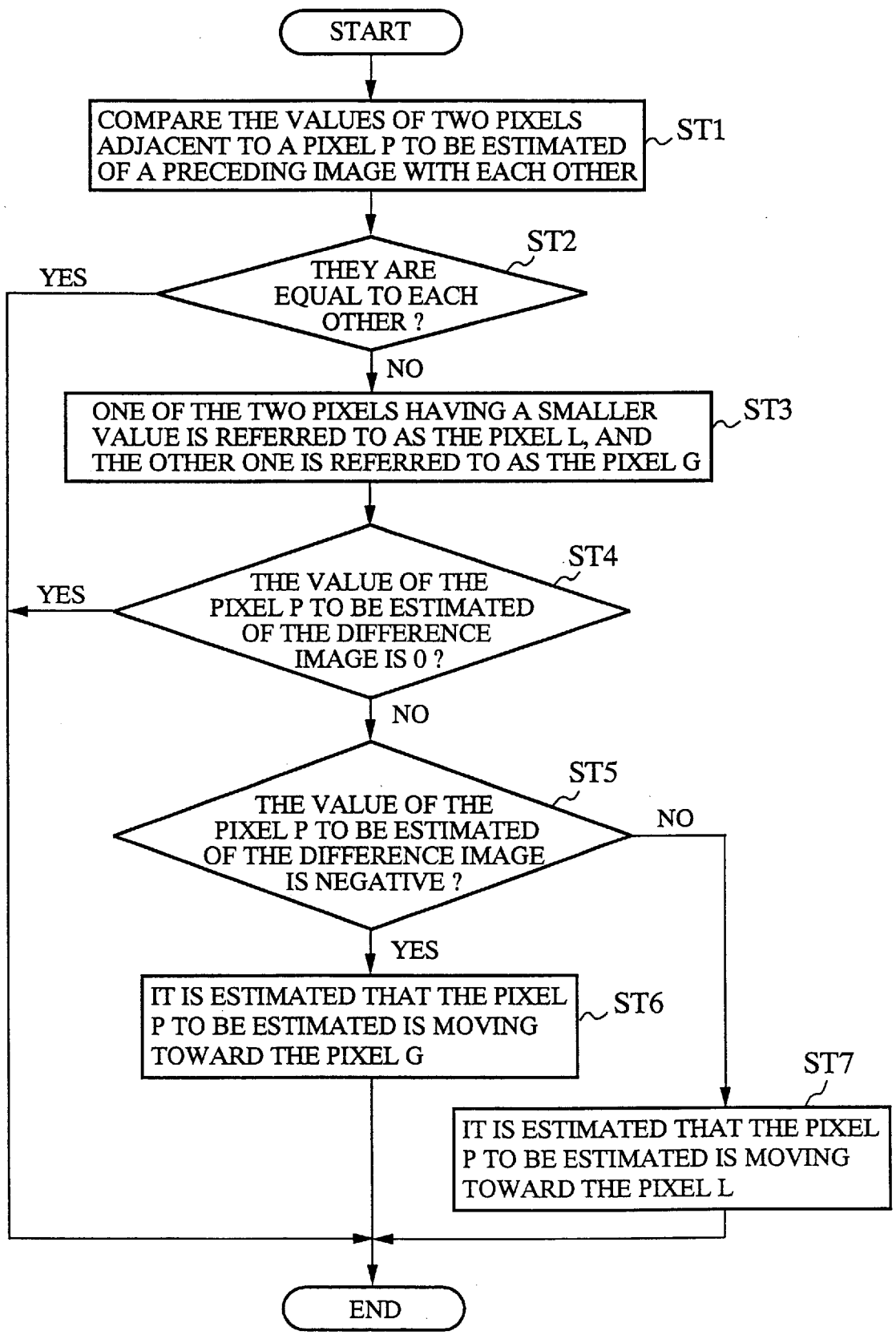

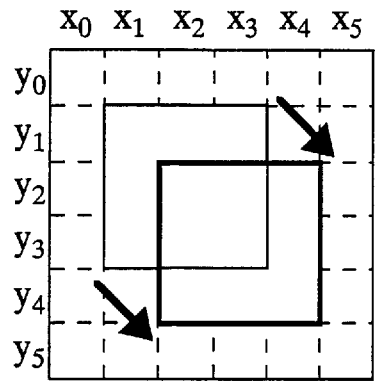

FIG.7

|     | $x_0$ | $x_1$ | $x_2$ | $x_3$ | $x_4$ | $x_5$ |
|-----|-----|-----|-----|-----|-----|-----|
| $y_0$ | 0 | 0 | 0 | 0 | 0 | 0 |
| $y_1$ | 0 | -40 | -40 | -40 | 0 | 0 |
| $y_2$ | 0 | -40 | 0 | 0 | 40 | 0 |
| $y_3$ | 0 | -40 | 0 | 0 | 40 | 0 |
| $y_4$ | 0 | 0 | 40 | 40 | 40 | 0 |
| $y_5$ | 0 | 0 | 0 | 0 | 0 | 0 |

FIG.8a

|     | $x_0$ | $x_1$ | $x_2$ |
|-----|-----|-----|-----|
| $y_0$ |  |  |  |
| $y_1$ | 10 | (-40) | 50 |
| $y_2$ |  |  |  |

|     | $x_0$ | $x_1$ | $x_2$ |
|-----|-----|-----|-----|
| $y_0$ |  | 10 |  |
| $y_1$ |  | (-40) |  |
| $y_2$ |  | 50 |  |

|     | $x_0$ | $x_1$ | $x_2$ |
|-----|-----|-----|-----|
| $y_0$ | 10 |  |  |
| $y_1$ |  | (-40) |  |
| $y_2$ |  |  | 50 |

|     | $x_0$ | $x_1$ | $x_2$ |
|-----|-----|-----|-----|
| $y_0$ |  |  | 10 |
| $y_1$ |  | (-40) |  |
| $y_2$ | 10 |  |  |

FIG.9

|     | $x_0$ | $x_1$ | $x_2$ | $x_3$ | $x_4$ | $x_5$ |
|-----|-----|-----|-----|-----|-----|-----|
| $y_0$ |  |  |  |  |  |  |
| $y_1$ |  | ↗↓ | ↑↓ | ↖↗ |  |  |
| $y_2$ |  | ←↓ |  |  | ←→ |  |
| $y_3$ |  | ↑↗ |  |  | ↘↓ |  |
| $y_4$ |  |  | ↖↑ | ↘ | ↘ |  |
| $y_5$ |  |  |  |  |  |  |

PROCESSING DEVICE AND METHOD FOR DETERMINING DIRECTION OF MOTION OF AN IMAGE

BACKGROUND OF THE INVENTION

1. Field of the Invention

The present invention relates to an image processing device for estimating motion of a moving object is moving included in a series of images and for determining the direction in which the moving object within the series of images.

2. Description of the Prior Art

A prior art method of determining the direction in which a moving object included in a series of images is moving using a neural network, is disclosed in Japanese Patent Application Laying Open (KOKAI) No. 4-241077, The prior art method is called optical flow which can reflect the motion of the moving object in order to estimate a velocity vector of each point in the moving object. In the prior art method, by using a function representing a constraint that the velocity vector varies smoothly in the vicinity of each point, computations are carried out repeatedly until the function converges to an equilibrium. An optical flow can be obtained as the computation result.

A problem with the prior art image processing device is that it needs a large amount of storage in order to carry out a large number of computations repeatedly using real numbers having high precision and further needs hardware used for speeding up the computation of the optical flow to provide the optical flow in real time.

SUMMARY OF THE INVENTION

The present invention is made to overcome the above problem. It is therefore an object of the present invention to provide an image processing device which can estimate motion of a moving object included in a series of images according to an algorithm having no repetitive computations and then compute vectors representing the direction in which the moving object is moving at a high speed.

In accordance with the present invention, there is provided an image processing device comprising: an image input unit for capturing a scene including a moving object so as to generate a series of images comprised of a plurality of pixels at predetermined intervals; an image storage unit for storing the series of images generated by the image input unit; a difference image generating unit for selecting two images at different times from among the plurality of images stored in the image storage unit and computing a difference between the selected two images so as to generate and hold a difference image; a direction estimating unit for estimating a direction or bearing of motion of the moving object along each of a plurality of axes for each of all the pixels by referring to the difference image held by the difference image generating unit so as to generate one or more vectors representing the directions of motion of the moving object along the plurality of axes for each of all the pixels; an initially-estimated motion vector unit for computing the sum of the plurality of vectors estimated by the direction estimating unit so as to generate an initially-estimated motion vector for each of all the pixels; and a vector averaging unit for averaging initially-estimated motion vectors in the vicinity of each of the plurality of pixels, including the initially-estimated motion vector of each of the plurality of pixels, so as to generate a motion vector for each of the plurality of pixels.

Preferably, the difference image generating unit computes a difference between luminance data of the selected two images so as to generate the difference image. The difference image generating unit can subtract the luminance data of an older one of the selected two images from the luminance data of the other one of the selected two images so as to generate the difference image.

The direction estimating unit can estimate a direction or bearing of motion of the moving object along each of four different axes: a horizontal axis, a vertical axis, an oblique axis which forms an angle of 45° against the horizontal axis, and another oblique axis which forms an angle of 135° against the horizontal axis. The direction estimating unit carries out its estimating process when the difference image has a value other than zero at a pixel to be estimated, and, if two pixels of a older one of the selected two images lying adjacent to the pixel being estimated and on both sided of the pixel to be estimated along each of the four different axes have different values, the direction estimating unit then estimates that the moving object at the pixel being estimated is moving from one of the two pixels having a smaller value to the other one having a larger value.

In accordance with a preferred embodiment, one of the two images selected when generating the difference image is a most current image and the other selected image is an immediately preceding image.

Alternatively, the difference image generating unit selects three images or first through third images at different times from among the plurality of images stored in the image storage unit and then computes a difference between the first and second images and a difference between the second and third images so as to generate and hold a difference image which is the average of the differences.

Further objects and advantages of the present invention will be apparent from the following description of the preferred embodiments of the invention as illustrated in the accompanying drawings.

BRIEF DESCRIPTION OF THE DRAWINGS

FIG. 1 is a block diagram showing the structure of an image processing device according to a preferred embodiment of the present invention;

FIGS. 2a through 2d are diagrams each showing one-directional motion of a moving boundary between light and dark areas;

FIGS. 3a through 3d are diagrams each showing a difference between the luminance at a current time and the luminance at a preceding time of a pixel at the edge of the moving boundary as illustrated in the corresponding one of FIGS. 2a through 2d;

FIG. 4 is a flow diagram showing an algorithm of estimating the direction in which a moving object is moving which is employed in a direction estimating unit of the image processing device of the preferred embodiment;

FIG. 5 is a diagram showing an example of incoming images including a moving object;

FIGS. 6a and 6b are diagrams showing the luminance data of all pixels of the images shown FIG. 5 at a preceding time and at a current time which are stored in an image storage unit of the image processing device of the preferred embodiment;

FIG. 7 is a diagram showing a difference between the luminance data, as shown in FIGS. 6a and 6b, of all the pixels of the images at the preceding time and at the current time, i.e., a difference image which is held by a difference image generating unit of the image processing device of the preferred embodiment;

FIGS. 8a through 8d are diagrams showing a relationship between the luminance data of a pixel being estimated of the difference image of FIG. 7 and the luminance data of two adjacent pixels of the preceding image shown in FIG. 6a, and vectors representing the direction in which the moving boundary at the pixel is moving, which have been estimated by the direction estimating unit of the image processing device of the preferred embodiment;

FIG. 9 is a diagram showing the output of the direction estimating unit when applying the algorithm shown in FIG. 4 to all the pixels of the images shown in FIGS. 6a and 6b;

FIG. 10 is a diagram showing the output of an initially-estimated motion vector generating unit of the image processing device of the preferred embodiment when the direction estimating unit furnishes the output as shown in FIG. 9; and FIG. 11 is a diagram showing the output of a vector averaging unit of the image processing device of the preferred embodiment when the direction computing unit furnishes the output as shown in FIG. 10.

DETAILED DESCRIPTION OF THE PREFERRED EMBODIMENT

Referring now to FIG. 1, there is illustrated a block diagram showing the structure of an image processing device according to a preferred embodiment of the present invention. In the figure, reference numeral 1 denotes an image input unit equipped with an image sensor which can capture a scene including a moving object and generate a series of electronic images at predetermined intervals, 2 denotes an image storage unit which can store the series of images generated by the image input unit 1 in the order in which the plurality of images were generated, 3 denotes a difference image generating unit which can select at least two images at different times from among the plurality of images which have been generated continuously and stored in the image storage unit 2, and compute a difference between the two selected images and generate and hold a difference image therein, 4 denotes a direction estimating unit which can estimate the direction of motion of a pixel P to be estimated included in the series of images and generate four vectors respectively lying along four different axes: a horizontal axis, a vertical axis, an oblique axis which forms an angle of 45° relative to the horizontal axis, and another oblique axis which forms an angle of 135° relative to the horizontal axis, and representing the direction in which the moving object at the pixel P is moving, 5 denotes an initially-estimated motion vector generating unit which can compute the sum of the four vectors of the pixel P currently being estimated, which have been estimated by the direction estimating unit 4, and furnish the computed summation as an initially-estimated motion vector of the pixel P, and 6 denotes a vector averaging unit which can average the initially-estimated motion vectors of the pixel P and other pixels in the vicinity of the pixel P and generate a motion vector representing the direction in which the moving object at the pixel P is moving for the pixel P.

Next, a description will be made as to the operation of the image processing unit of the preferred embodiment when a difference image is computed from the most current image and the immediately preceding image which are selected from a series of images.

When the image input unit 1 captures a scene including a moving object and converts the scene to a series of electronic images, the plurality of images are stored in the image storage unit 2 in the order that they were generated. The difference image generating unit 3 then selects the most current image at the current time and the immediately preceding image from among the plurality of images stored in the image storage unit 2, and subtracts the luminance data of the preceding image from the luminance data of the current image so as to generate and hold a difference image therein.

By referring to at least the immediately preceding image stored in the image storage unit 2, the direction estimating unit 4 compares the values of two adjacent pixels lying on opposite sides of a pixel P to be estimated and repeats this comparison along each of the four difference axes: the horizontal axis, the vertical axis, the oblique axis which forms an angle of 45° relative to the horizontal axis, and the other oblique axis which forms an angle of 135° relative to the horizontal axis, with each other. By further referring to the difference image held by the difference image generating unit 3, the direction estimating unit 4 then estimates the direction of motion of the moving object at the pixel P along each of the four difference axes.

A direction estimating algorithm for estimating the direction of each pixel along each of the four different axes will be explained hereafter with reference to FIGS. 2a through 2d, 3a through 3d, and 4. In this embodiment, it is assumed that a series of images generated includes a moving boundary between a light area having a luminance of 50 and a dark area having a luminance of 10.

Referring next to FIGS. 2a through 2d, there are illustrated diagrams, each showing a one-directional motion of the moving boundary between light and dark areas. The thin and thick lines in each of the figures show the moving boundaries at the preceding time and at the current time, respectively. Furthermore, the arrow in each of the figures shows the direction in which the moving boundary is moving. Referring next to FIGS. 3a through 3d, there are illustrated diagrams each showing the difference between the luminance data at the current time and the luminance data at the preceding time of the pixel being estimated in the vicinity of the moving boundary as illustrated in the corresponding one of FIGS. 2a through 2d. FIGS. 3a through 3b correspond to FIGS. 2a through 2d, respectively. It is apparent from comparison between FIGS. 2a through 2d and FIGS. 3a through 3d that when the difference between the luminance data at the current time and the luminance data at the preceding time of the pixel being estimated in the vicinity of the moving boundary is negative, the moving boundary is moving toward the light area; when the difference between the luminance data at the current time and the luminance data at the preceding time of the pixel being estimated in the vicinity of the moving boundary is positive, the moving boundary is moving toward the dark area.

Assuming that a rule governing a method of estimating the direction in which a moving object included in a series of images is moving is based on the relationship between the difference between the luminance data at the most current time and the luminance data at the immediately preceding time of a pixel in the vicinity of the boundary of the moving object, and the direction in which the moving boundary at the pixel is moving, the direction estimating unit 4 estimates the direction of motion of the pixel along each of the four different axes according to an algorithm shown in a flow diagram of FIG. 4.

The direction estimating unit 4, in step ST1, compares the values or luminance data of two adjacent pixels lying on opposite sides of a pixel P to be estimated and along one of the four difference axes by referring to the immediately preceding image stored in the image storage unit 2. The direction estimating unit 4, in step ST2, then determines whether or not the two adjacent pixels are equal to each other. When the values or luminance data of the two pixels adjacent to the pixel P are equal to each other, the direction estimating unit 4 determines that the pixel P is not located in the vicinity of a moving boundary between light and dark areas, and then terminates the direction estimating process for the pixel P.

When the values or luminance data of the two pixels adjacent to the pixel P being estimated are different from each other, the direction estimating unit 4 refers to the one of the two adjacent pixels having a smaller value as the pixel L and the other pixel having a larger value as the pixel G, in step ST3. The direction estimating unit 4, in step ST4, further refers to the difference image held by the difference image generating unit 3, and then determines whether the value of the pixel P being estimated of the difference image is 0 or not. In performing step ST4, when the value of the pixel P of the difference image is 0, the direction estimating unit 4 terminates the direction estimating process for the pixel P since there is no difference between the luminance data of the pixel P of the preceding image and the luminance data of the pixel P of the current image.

When the pixel P of the difference image has a value other that 0, the direction estimating unit 4 further determines whether the value of the pixel P of the difference image is negative or not, in step ST5. When the value of the pixel P of the difference image is negative, the direction estimating unit 4, in step ST6, determines that the moving boundary is moving in the direction from the pixel P to the pixel G according to the aforementioned direction estimating rule. When the value of the pixel P of the difference image is not negative, i.e., is positive, the direction estimating unit 4, in step ST7, determines that the moving boundary is moving in the direction from the pixel P to the pixel L. The direction estimating unit 4 thus completes the direction estimating process for the pixel P.

Next, the description will be directed to how the optical flow is computed from the series of images including the moving object, with reference to FIG. 5, showing an example of the series of incoming images. In the following description, it is assumed that a series of 6×6 pixel images is generated by the image input unit 1 and a square object having a uniform luminance of 50, which will be referred to as target, is moving against a background having a uniform luminance of 10 within the series of images, as shown in FIG. 5.

The image input unit 1 captures a scene including the target that is moving in the bottom right-hand slanting direction by one pixel as shown in FIG. 5, and then generates a series of two images, one of which is referred to as the preceding image and the other one of which is referred to as the current image. The thin and thick solid lines in FIG. 5 show the outlines of the target at the preceding time and at the current time, respectively. The luminance data of all the pixels of the preceding and current images are stored in the image storage unit 2. The luminance data of all the pixels of the preceding image are shown in FIG. 6a, and the luminance data of all the pixels of the current image are shown in FIG. 6b. The difference image generating unit 3 computes the difference between the luminance data of the current image and the luminance data of the preceding image, that is, subtracts the luminance data of the preceding image from the luminance data of the current image, generating and holding a difference image, as shown in FIG. 7, therein.

Next, a description will be made as to the operation of the direction estimating unit 4 using the difference image with reference to FIGS. 8a through 8d and FIG. 9. FIGS. 8a through 8d illustrate diagrams showing a relationship between the value of a pixel at $(x_1, y_1)$ being estimated from the difference image of FIG. 7 and the luminance data of two adjacent pixels of the preceding image shown in FIG. 6a, and vectors representing the direction in which the moving boundary at the pixel $(x_1, y_1)$ is moving, which have been estimated by the direction estimating unit 4. With respect to the horizontal axis as shown in FIG. 8a, since the value of the pixel at $(x_1, y_1)$ of the difference image is −40 and the values of the other pixels lying adjacent to and on the left and right sides of the pixel $(x_1, y_1)$ are 10 and 50 from the preceding image, respectively, the direction estimating unit 4 estimates that the target at the pixel being estimated at $(x_1, y_1)$ is moving toward the pixel at $(x_2, y_1)$ lying on the right side of the pixel at $(x_1, y_1)$. Similarly, with respect to the vertical axis as shown in FIG. 8b, the direction estimating unit 4 estimates that the target at the pixel being estimated at $(x_1, y_1)$ is moving toward the pixel at $(x_1, y_2)$ lying on the bottom side of the pixel at $(x_1, y_1)$ because the pixel being estimated at $(x_1, y_1)$ is negative and the pixel $(x_1, y_0)$ is smaller than the pixel at $(x_1, y_2)$. Furthermore, with respect to the oblique axis which forms an angle of 135° against the horizontal axis as shown in FIG. 8c, the direction estimating unit 4 estimates that the target at the pixel being estimated at $(x_1, y_1)$ is moving toward the pixel at $(x_2, y_2)$ lying on the bottom right-hand side of the pixel at $(x_1, y_1)$. With respect to the oblique axis which forms an angle of 45° against the horizontal axis as shown in FIG. 8d, since the values of two pixels adjacent to the pixel at $(x_1, y_1)$ are equal to each other, no estimation of the direction is carried out.

Referring next to FIG. 9, there is illustrated a diagram showing the output of the direction estimating unit 4 when applying the algorithm shown in FIG. 4 to all the pixels of the series of images shown in FIG. 5. As shown in FIG. 9, a plurality of vectors each showing the direction in which the target at each pixel is moving along each of the four different axes can be computed for each pixel of the difference image having a non-zero value.

Referring next to FIG. 10, there is illustrated a diagram showing the output of the initially-estimated motion vector generating unit 5. For a pixel being estimated having one or more vectors generated by the direction estimating unit 4, the initially-estimated motion vector generating unit 5 computes the sum of the one or more vectors for the pixels as shown in FIG. 9 and generates, for each of those pixels, an initially-estimated motion vector, which is the sum of the one or more vectors, for the pixel being estimated. The result of the summing is as shown in FIG. 10. When the pixel being estimated has no vectors, that is, when the pixel being estimated does not lie in the vicinity of the moving boundary, the initially-estimated motion vector generating unit 5 generates a zero initially-estimated motion vector. Referring next to FIG. 11, there is illustrated a diagram showing the output of the vector averaging unit 6. The vector averaging unit 6 computes the sum of the initially-estimated vectors of each pixel being estimated and the initially-estimated vectors of the eight pixels surrounding that pixel being estimated, the initially-estimated vectors of the eight surrounding pixels have also been initially estimated by the initially-estimated motion vector generating unit 5. The vector averaging unit 6 averages the sum (or divides the sum by 9) to generate a motion vector, which is the average of the sum, for the pixel being estimated. The result of the averaging process for each of the pixels in FIG. 10 including at least one vector is shown in FIG. 11. The optical flow is thus obtained.

As previously explained, the embodiment of the present invention offers an advantage of being able to compute an optical flow without repetitive computations.

Numerous variants may be made in the exemplary embodiment mentioned above. It is apparent that three continuous or first through third continuous images, instead of two continuous images, can be selected to compute a difference image. In this case, a difference between the first image and the second image is computed, and a difference between the second image and the third image is also computed. The differences are then averaged and the average is stored as the difference image in the difference image storage unit 3. Alternatively, a difference image can be generated by using two images which are discrete or noncontinuous, for example, the most current image and another image that was generated a predetermined time before.

It is also clear that the direction estimating unit 4 can estimate the direction in which the moving boundary is moving along each of a plurality of different axes other than the four axes mentioned above for each pixel.

As previously mentioned, the present invention offers the following advantages.

An image processing device according to the present invention can compute a difference between two images at different times selected from among a series of images stored in an image storage unit and generate and hold a difference image, estimate a direction or bearing of motion of a moving object included in the series of images along each of a plurality of axes for each of the pixels by referring to the difference image so as to generating a plurality of vectors representing the respective directions of motion of the moving object for each of all the pixels, compute the sum of the plurality of vectors estimated to generate an initially-estimated motion vector for each of the pixels, and average initially-estimated motion vectors in the vicinity of each of the plurality of pixels, including the initially-estimated motion vector of each of the plurality of pixels, to generate a motion vector for each of the plurality of pixels. Accordingly, the present invention offers an advantage of computing an optical flow at a high speed without repetitive computations and hence to estimate the motion of the moving object in real time.

By applying the above-mentioned algorithm according to the present invention to an image recognition system, a motion of a human being such as a gesture can be recognized in real time. Accordingly, when the image processing device of the present invention is incorporated into an image recognition system for use in a game machine, it makes it possible for users to manipulate the game machine without having to use an interface such as a joystick.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing device comprising:

image input means for capturing a scene including a moving object and generating a series of images, each image comprising a plurality of pixels, each of the images being generated at respective, different times;

image storage means for storing the series of images generated by said image input means;

difference image generating means for selecting at least two images generated at different times from among the series of images stored in said image storage means, computing a difference between the selected images by subtracting respective values of corresponding pixels of the selected images from each other to generate a difference image including a plurality of difference pixels having respective difference values that may be positive, negative, or zero, and storing the difference image;

direction estimating means for estimating a direction of motion of the moving object along a plurality of axes for respective pixels of the difference image from the values of the difference pixels of the difference image and generating at least one vector representing the direction of motion of the moving object along the axes for the respective pixels, each vector having a direction along an axis determined by whether the corresponding difference pixel is positive or negative and whether the pixels on opposite sides of and adjacent to the difference pixel along the respective axis have different values;

means for computing the sum of the vectors estimated by said direction estimating means for the respective difference pixels and generating an initially-estimated motion vector for the respective difference pixels; and means for averaging, for a respective difference pixel, the initially-estimated motion vector for the respective difference pixel and for difference pixels adjacent the respective difference pixel, thereby generating a motion vector for the respective difference pixel.

2. The image processing device according to claim 1, wherein said difference image generating means computes a difference between luminance data of the selected images for generating the difference image.

3. The image processing device according to claim 1, wherein said difference image generating means selects two images for computing the difference image and one of the two images selected is a current image and the other selected image is an immediately preceding image.

4. The image processing device according to claim 1, wherein said difference image generating means selects three images for computing the difference image, including first, second, and third images, generated at different times, from among the series of images stored in said image storage means, and computes a first difference between the first and second images and a second difference between the second and third images and generates and stores as the difference image an average difference image comprising an average of the first and second differences.

5. The image processing device according to claim 2, wherein said difference image generating means selects a first image generated at a first time and a second image generated at a second time, later than the first time, and subtracts the luminance data of the first image from the luminance data of the second image to generate the difference image.

6. The image processing device according to claim 5, wherein said direction estimating means estimates a direction of motion of the moving object along each of four different axes: a horizontal axis, a vertical axis, a first oblique axis forming an angle of forty-five degrees with respect to the horizontal axis, and a second oblique axis forming an angle of one hundred thirty-five degrees with respect to the horizontal axis.

7. The image processing device according to claim 1, wherein said direction estimating means estimates motion for a respective difference pixel only when the respective difference pixel has a value other than zero.

8. The image processing device according to claim 1, wherein, when the pixels on an axis and on opposite sides of a difference pixel have different values, said direction estimating means determines the direction of the vector for a difference pixel along the axis to extend from the adjacent pixel on one side of the difference pixel along the axis and having a smaller value to the adjacent pixel along the axis and on the opposite side of the difference pixel having a larger value, when the difference value of the difference pixel is negative, and determines the direction of the vector for a difference pixel along the axis to extend from the adjacent pixel on one side of the difference pixel along the axis and having a larger value to the adjacent pixel along the axis and on the opposite side of the difference pixel having a smaller value, when the difference value, of the difference pixel is positive.

9. A method of determining a direction of motion of an image comprising:

capturing a scene including a moving object and generating a series of images, each image comprising a plurality of pixels, each of the images being generated at respective, different times;

storing the series of images generated;

selecting at least two images generated at different times from among the series of images, computing a difference between the selected images by subtracting respective values of corresponding pixels of the selected images from each other to generate a difference image including a plurality of difference pixels having respective difference values that may be positive, negative, or zero, and storing the difference image;

estimating a direction of motion of the moving object along a plurality of axes for respective pixels of the difference image from the values of the difference pixels of the difference image and generating at least one vector representing the direction of motion of the moving object along the axes for the respective pixels, each vector having a direction along an axis determined by whether the corresponding difference pixel is positive or negative and which of the pixels on opposite sides of and adjacent to the difference pixel along the respective axis has a larger value;

computing the sum of the vectors estimated for the respective difference pixels and generating an initially-estimated motion vector for the respective difference pixels; and averaging, for a respective difference pixel, the initially-estimated motion vector for the respective difference pixel and for difference pixels adjacent the respective difference pixel, thereby generating a motion vector for the respective difference pixel.

10. The method according to claim 9, including computing a difference between luminance data of the selected images for generating the difference image.

11. The image processing method according to claim 9, including selecting two images for computing the difference image wherein one of the two images selected is a current image and the other selected image is an immediately preceding image.

12. The method according to claim 9, including selecting three images for computing the difference image, including first, second, and third images, generated at different times, from among the series of images stored, and computing a first difference between the first and second images and a second difference between the second and third images and generating and storing as the difference image an average difference image comprising an average of the first and second differences.

13. The method according to claim 10, including selecting a first image generated at a first time and a second image generated at a second time, later than the first time, and subtracting the luminance data of the first image from the luminance data of the second image to generate the difference image.

14. The method according to claim 13, including estimating a direction of motion of the moving object along each of four different axes: a horizontal axis, a vertical axis, a first oblique axis forming an angle of forty-five degrees with respect to the horizontal axis, and a second oblique axis forming an angle of one hundred thirty-five degrees with respect to the horizontal axis.

15. The method according to claim 9, including estimating motion for a respective difference pixel only when the respective difference pixel has a value other than zero.

16. The method according to claim 9, including, when the pixels on an axis and on opposite sides of a difference pixel have different values, determining the direction of the vector for a difference pixel along the axis to extend from the adjacent pixel on one side of the difference pixel along the axis and having a smaller value to the adjacent pixel along the axis and on the opposite side of the difference pixel having a larger value, when the difference value of the difference pixel is negative, and determining the direction of the vector for a difference pixel along the axis to extend from the adjacent pixel on one side of the difference pixel along the axis and having a larger value to the adjacent pixel along the axis and on the opposite side of the difference pixel having a smaller value, when the difference value of the difference pixel is positive.

* * * * *